US008863140B2

(12) United States Patent
Sistare

(10) Patent No.: US 8,863,140 B2
(45) Date of Patent: Oct. 14, 2014

(54) METHOD FOR RESOURCE MANAGEMENT ALLOCATING AND FREEING CREDITS FROM AND TO A RESOURCE CREDIT TREE

(75) Inventor: Steven Sistare, Westford, MA (US)

(73) Assignee: Oracle International Corporation, Redwood Shores, CA (US)

(*) Notice: Subject to any disclaimer, the term of this patent is extended or adjusted under 35 U.S.C. 154(b) by 449 days.

(21) Appl. No.: 13/220,518

(22) Filed: Aug. 29, 2011

(65) Prior Publication Data

US 2013/0055279 A1    Feb. 28, 2013

(51) Int. Cl.
G06F 9/46 (2006.01)
G06F 9/50 (2006.01)

(52) U.S. Cl.
CPC .......................................... G06F 9/50 (2013.01)
USPC .......................................... 718/104; 718/105

(58) Field of Classification Search
None
See application file for complete search history.

(56) References Cited

U.S. PATENT DOCUMENTS

| | | | | |
|---|---|---|---|---|
| 6,466,559 B1 * | 10/2002 | Johansson et al. | ............ | 370/335 |
| 7,356,770 B1 * | 4/2008 | Jackson | ............... | 715/736 |
| 7,536,693 B1 * | 5/2009 | Manczak et al. | ............. | 718/105 |
| 7,908,605 B1 * | 3/2011 | Graupner et al. | ............ | 718/104 |
| 8,060,883 B1 * | 11/2011 | Rao et al. | ....................... | 718/104 |
| 8,117,619 B2 * | 2/2012 | LaFrese et al. | ............... | 718/104 |
| 8,381,217 B1 * | 2/2013 | Wijayaratne et al. | ......... | 718/102 |
| 2005/0235289 A1 * | 10/2005 | Barillari et al. | ............... | 718/100 |
| 2006/0190482 A1 * | 8/2006 | Kishan et al. | ............. | 707/103 Y |
| 2012/0191773 A1 * | 7/2012 | Appleton | ..................... | 709/203 |

FOREIGN PATENT DOCUMENTS

EP     0225755 A2    6/1987

OTHER PUBLICATIONS

Goodman, J. et al., "Efficient Synchronization Primitives for Large-Scale Cache-Coherent Multiprocessors," In Proceedings of the 3rd International Conference on Architectural Support for Programming Languages and Operating Systems, Boston, Massachusetts, Apr. 1989, 12 pages.
Shavit, N. and Zemach, A., "Combining Funnels: A Dynamic Approach to Software Combining," Journal of Parallel and Distributed Computing, vol. 60, Issue 11, Nov. 2000, 33 pages.
Ellen, F. et al., "SNZI: Scalable NonZero Indicators," In 26th ACM Symposium on Principles of Distributed Computing, Portland, Oregon, Aug. 12-15, 2007, 10 pages.
Hendler, D. et al., "Flat Combining and the Synchronization-Parallelism Tradeoff," In the 22nd ACM Symposium on Parallelism in Algorithms and Architectures, Santorini, Greece, Jun. 13-15, 2010, 10 pages.

(Continued)

Primary Examiner — Meng An
Assistant Examiner — Tammy Lee
(74) Attorney, Agent, or Firm — Osha Liang LLP

(57) ABSTRACT

A resource credit tree for resource management includes leaf nodes and non-leaf nodes. The non-leaf nodes include a root node and internal nodes. Resource management includes initializing a operation corresponding to a resource pool, selecting, using a hash function, a leaf node of a resource credit tree, and identifying a number of available credits of the leaf node. Resource management may further include traversing, using a backward traversal path, from the leaf node to a non-leaf node based on determining that the number of available credits is less than a required number of credits or determining that capacity of the leaf node is less than the summation of the number of credits to free to the resource credit tree and the number of available credits. Resource management may further allocating and freeing credits from and to the resource credit tree.

19 Claims, 12 Drawing Sheets

(56) References Cited

OTHER PUBLICATIONS

Boyd-Wickizer, S. et al., "An Analysis of Linux Scalability to Many Cores," In Proceedings of the 9th USENIX Conference on Operating Systems Design and Implementation, Vancouver, Canada, Oct. 4-6, 2010, 16 pages.

Opensolaris.org, "OpenGrok," src.opensolaris.org/source/xref/onnv/onnv-gate/usr/src/uts/common/vm/vm_page.c, Jun. 14, 2005, 111 pages.

Ali, Khayri Abdel-Hamid Mohamed; Object-Oriented Storage Management and Garbage Collection in Distributed Processing Systems; Royal Institute of Technology, Department of Computer Systems; Stockholm, Sweden; Dec. 20, 1984 (236 pages).

* cited by examiner

METHOD FOR RESOURCE MANAGEMENT ALLOCATING AND FREEING CREDITS FROM AND TO A RESOURCE CREDIT TREE

BACKGROUND

In systems having a finite number of resources, the problem of resource allocation may be difficult to resolve. In the worst case scenario, the system may encounter a race condition or enter into a deadlocked state. Other undesirable outcomes may include dropped or delayed high priority requests and extreme inefficiency (e.g., low resource utilization, etc.).

A resource unit is any segment of a resource that can be allocated and freed by a single client (e.g., a thread). A resource unit may be a part of a group of resource units that is shared system wide. Allocation of a resource unit gives the client the right to use the resource unit. For example, a resource unit may be a page of physical memory, a page of swap space on disk, one unit of runtime on a central processing unit (CPU), a network packet, a block in the database buffer cache, etc. A resource allocation algorithm may be utilized to allocate and free resource units. The possible uses of resource allocation algorithms in hardware and software applications are many and varied.

SUMMARY

In general, in one aspect, the invention relates to a method for resource management. The method includes initializing a operation to allocate a number of credits corresponding to a resource pool, selecting, using a hash function, a leaf node of a resource credit tree, identifying a number of available credits of the leaf node, and determining that the number of credits exceeds the number of available credits of the leaf node. The method further includes traversing, beginning at the leaf node, the resource credit tree through a backward traversal path to a first non-leaf node of the resource credit tree, and calculating, while traversing the resource credit tree, a tally of cascading credits based on nodes in the backward traversal path. The backward traversal path includes the leaf node, the first non-leaf node, and a second non-leaf node. The method further includes identifying a number of available credits of the first non-leaf node, determining that the number of available credits of the first non-leaf node exceeds the tally of cascading credits, and allocating, from the first non-leaf node, the number of credits in response to determining that the number of available credits of the first non-leaf node exceeds the tally of cascading credits.

In general, in one aspect, the invention relates to a non-transitory computer-readable medium storing instructions for resource management. The instructions include functionality to initialize a operation to free a number of credits, initialize a tally of cascading credits to the number of credits, select, using a hash function, a leaf node of a resource credit tree, identify a capacity of the leaf node and a number of available credits of the leaf node, calculate a summation of the number of allocated credits and the number of available credits of the leaf node, and determine that the summation exceeds the capacity of the leaf node. The instructions further include functionality to traverse, beginning at a leaf node and based on determining that the summation exceeds the capacity of the leaf node, the resource credit tree through a backward traversal path to a first non-leaf node of the resource credit tree, and modify, while traversing the resource credit tree, the tally of cascading credits based on nodes in the backward traversal path. The backward traversal path includes the leaf node, the first non-leaf node, and a second non-leaf node. Further, the tally of cascading credits is used to update a number of available credits of at least one of the nodes while traversing the resource credit tree. The instructions further include functionality to identify a capacity of the first non-leaf node and a number of available credits of the first non-leaf node, and free, based on the capacity of the first non-leaf node and the number of available credits of the first non-leaf node, the tally of cascading credits to the first non-leaf node.

In general, in one aspect, embodiments of the invention relate to a system for resource allocation. The system includes a computer processor, a resource credit tree, a resource object, and a client. The resource credit tree includes non-leaf nodes comprising a root node and internal nodes, and leaf nodes. The resource object includes a count of additional available credits of a resource pool. The client includes functionality to initialize a operation to allocate a number of credits, select, using a hash function, a leaf node, traverse, beginning at the leaf node, the resource credit tree through a backward traversal path to a first non-leaf node, and calculate, while traversing the resource credit tree, a tally of cascading credits based on nodes in the backward traversal path. The backward traversal path comprises the leaf node, the first non-leaf node, and a second non-leaf node. The client further includes functionality to identify a number of available credits of the first non-leaf node, determine that the number of available credits of the first non-leaf node exceeds the tally of cascading credits, and allocate, from the first non-leaf node, the number of credits in response to determining that the number of available credits of the first non-leaf node exceeds the first tally of cascading credits.

Other aspects of the invention will be apparent from the following description and the appended claims.

DETAILED DESCRIPTION

Figure 1:
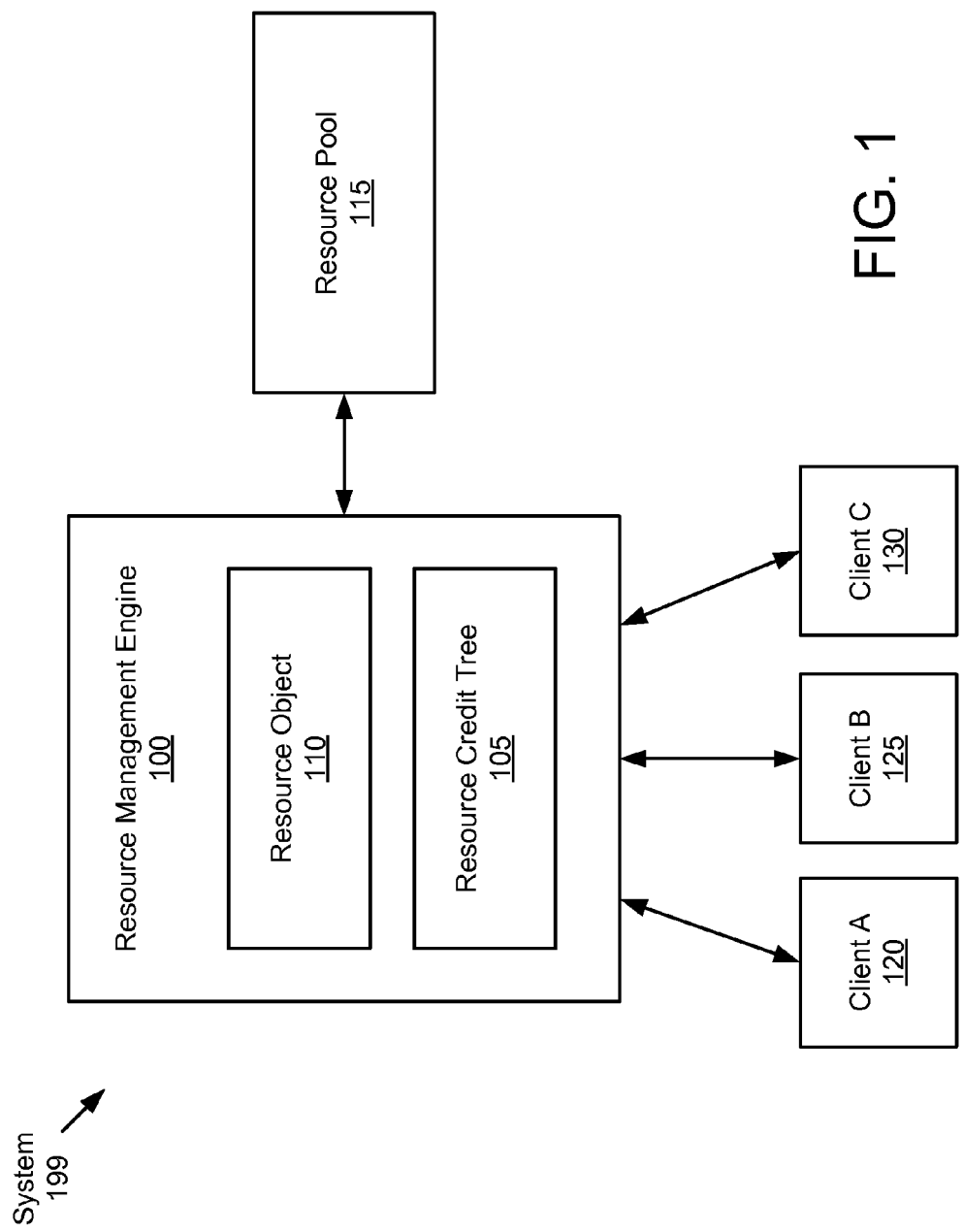
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for allocating and/or freeing credits corresponding to a resource credit tree. In general, embodiments of the invention initiate an allocation operation to allocate or free one or more credits corresponding to a resource pool. Based on the allocation operation, the resource credit tree may be traversed while maintaining a tally of cascading credits. During the traversal, a number of available credits for one or more nodes in the traversal path may be compared to the tally of cascading credits. Based on the comparison, the required credit(s) may be allocated or freed from the resource credit tree.

FIG. 1 shows a system (199) in accordance with one embodiment of the invention. As shown in FIG. 1, the system (199) has multiple components including a resource management engine (100), a resource object (110), a resource credit tree (105), a resource pool (115), and one or more clients (e.g., client A (120), client B (125), client C (130)). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. There may be more than one of each separate component running on a device, as well as any combination of these components within a given embodiment of the invention.

In one or more embodiments of the invention, the resource pool (115) is a shared collection of resource units. The resource pool (115) may be a physical resource, a software resource, or an abstraction of one or more shared resources represented as a data structure in memory. Examples of a resource pool (115) may include, but are not limited to, one or more hard disk drives, one or more central processing units (CPUs), a random access memory (RAM), a file system, a database, and/or any shared resource capable of allocating one or more resource units. The resource pool (115) may be partitioned into resource units. Each resource unit in the resource pool (115) may be allocated to no more than one client at any given time. Examples of a resource unit may include, but are not limited to, a page of physical memory, a page of swap space on disk, one or more units of CPU run time, and a block in a database buffer cache.

In one or more embodiments of the invention, a credit represents an exclusive right to use one or more resource units in the resource pool (115). For example, a single credit may represent the right to allocate a page of physical memory, to allocate a page of swap space on disk, to lock a page in memory, to run for one unit of central processing unit (CPU) time, to send a network packet, to allocate a block in the database buffer cache, etc.

In one or more embodiments of the invention, the resource management engine (100) includes data structures for managing credits. Specifically, the resource management engine (100) includes a resource credit tree (105) and a resource object (110) in one or more embodiments of the invention. The resource management engine (100) may optionally include instructions for manipulating the resource credit tree (105), such as to shrink or grow the resource credit tree (105).

Figure 2:
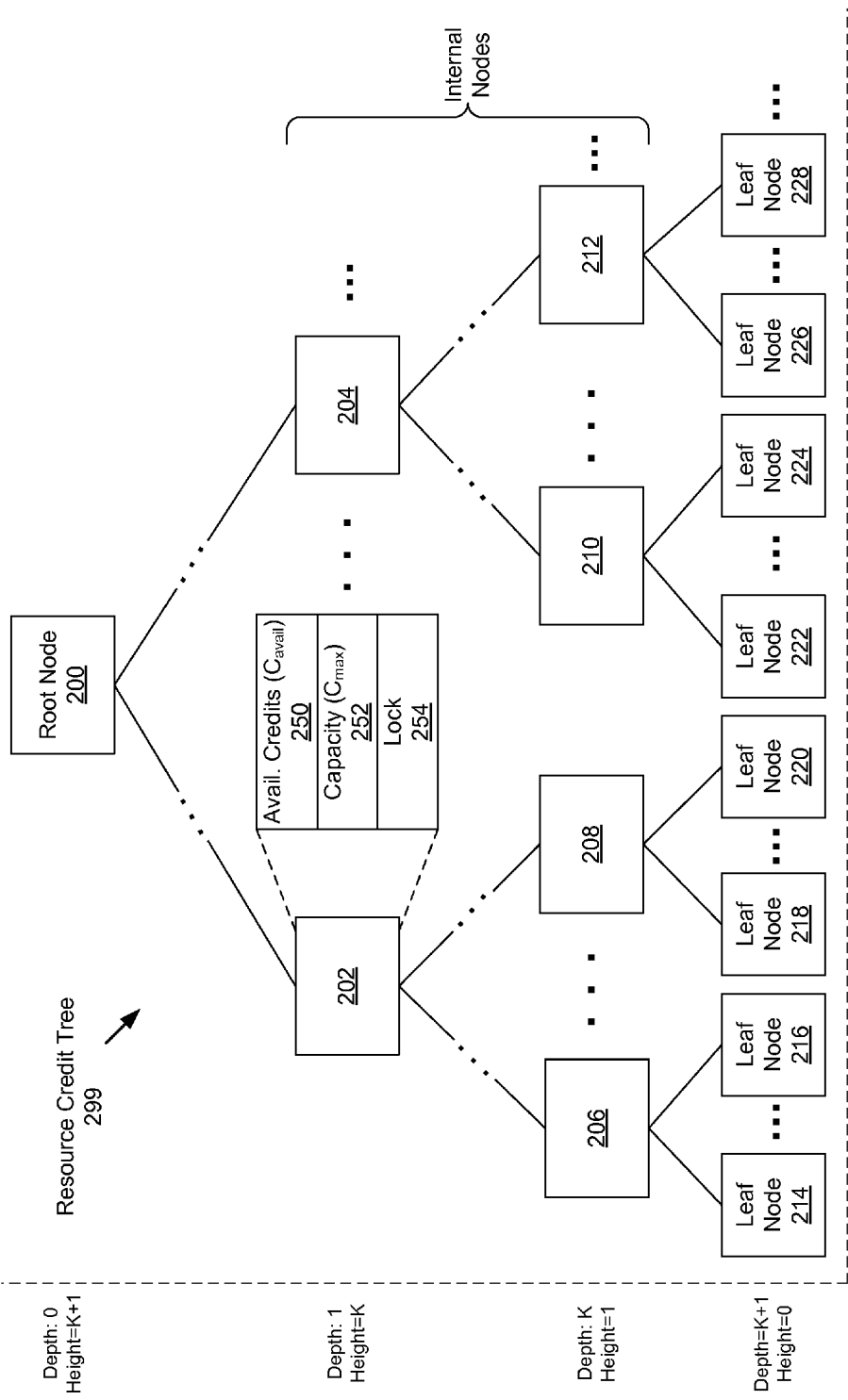
FIG. 2 shows a resource credit tree in accordance with one or more embodiments of the invention.

In one or more embodiments of the invention, the resource credit tree (105) is a data structure corresponding to the resource pool (115). The resource credit tree (105) may represent at least a subset of available credits corresponding to the resource pool. In one or more embodiments of the invention, the resource credit tree (105) includes non-leaf nodes and leaf nodes. In one or more embodiments of the invention, the non-leaf nodes include a root node and, optionally, one or more internal nodes. Specifically, a non-leaf node may be a root node or an internal node. The nodes in the resource credit tree (105) may be connected by one or more edges such that each node (with the exception of the root node) has only one parent. The resource credit tree (105) may be a binary tree, a k-ary tree (for any integer k>2), or an irregular tree in accordance with various embodiments of the invention. A full binary or k-ary tree refers to a resource credit tree (105) in which each non-leaf node has an equal number of children (i.e., 2 and k, respectively). FIG. 2 depicts a resource credit tree in accordance with one or more embodiments of the invention.

FIG. 2 shows a resource credit tree (299) in accordance with one embodiment of the invention. In FIG. 2, the use of collinear dots indicates that additional items of similar type to the preceding and succeeding items (with respect to the dots) may optionally exist. As shown in FIG. 2, the resource credit tree (299) has multiple components including a root node (200), one or more internal nodes (e.g., 202, 204, 206, 208, 210, 212), and one or more leaf nodes (e.g., 214, 216, 218, 220, 222, 224, 226, 228). In one or more embodiments of the invention, the number of leaf nodes in the resource credit tree is approximately proportional to the number of processors. In other words, the number of leaf nodes increases monotonically with the number of processors. For example, the number of leaf nodes may be in a one to one relationship with the number of processors, a two to one relationship, etc.

Each node in the resource credit tree (299) includes an available number of credits ($C_{avail}$) (250), a capacity ($C_{max}$) (252), and a lock value (254). The components of the resource credit tree (299) may be stored on one or more storage devices including, but not limited to, one or more hard disk drives, one or more random access memory (RAM) devices, one or more optical storage devices, one or more flash memory devices, and/or any combination thereof. The components of the resource credit tree (299) may reside within the same device or may be located on separate devices connected by a network (e.g. the Internet), with wired and/or wireless segments. There may be more than one of each separate component residing on a device, as well as any combination of these components within a given embodiment of the invention.

A depth value of the resource credit tree (299) refers to a level of the tree beginning with a zero value at the root node and incrementing downward at each subsequent level. A height value of the resource credit tree (299) refers to a level of the tree beginning with a zero value at the lowest level of the tree and incrementing upward at each subsequent level. Height and depth values for the resource credit tree (299) are indicated on the vertical axis of FIG. 2.

In one or more embodiments of the invention, the available number of credits ($C_{avail}$) (250) is a number of unallocated credits in a node which are available for allocation. Each node in the resource credit tree (299) may have a different $C_{avail}$ value (depending on usage). The available number of credits ($C_{avail}$) (250) may range in value between zero and the capacity ($C_{max}$) (252) (inclusive).

In one or more embodiments of the invention, the capacity ($C_{max}$) (252) is a maximum number of credits that can be stored in a node. The capacity ($C_{max}$) (252) may be constant for each level of the tree. Thus, in one or more embodiments of the invention, a constant value for $C_{max}$ (252) is defined at tree creation time for each level of the resource credit tree (299). Furthermore, in one or more embodiments of the invention, the constant value for $C_{max}$ (252) may double at each subsequent level (beginning at height=0). Given a capacity of the leaf nodes ($C_{max}$) of a binary tree, the capacity for other nodes in the tree may be $C_{max}*2^{height(node)}$, where height(leaf)=0. For a k-ary tree, the capacity for a node may be calculated as a function of the leaf node capacity ($C_{max}$) multiplied by k raised to the power of the node's height in the tree: $C_{max}*k^{\wedge}height(node)$. For an irregular tree, the capacity of a node may be the sum of the capacities of the node's children.

In one or more embodiments of the invention, each node in the resource credit tree (299) includes a lock value (254) representing a state of the node. The state may be locked or unlocked, and may include a reference to a client currently holding a lock on the node.

In one or more embodiments of the invention, the resource credit tree (299) is traversed along a forward traversal path or a backward traversal path. A forward traversal path is any contiguous path along a branch of the resource credit tree (299) beginning at a node residing at a higher height of the tree and ending at a node residing at a lower height of the tree. For example, 202→208→218 and 204→212 are forward traversal paths in the resource credit tree (299) in one or more embodiments of the invention. A backward traversal path is any contiguous path along a branch of the resource credit tree (299) beginning at a node residing at a lower height of the tree and ending at a node residing at a higher height of the tree. For example, 220→208→202 and 204→200 are backward traversal paths in the resource credit tree (299) in one or more embodiments of the invention.

Returning to FIG. 1, a client (e.g., client A (120), client B (125) may be any process, thread, or entity requiring one or more credits from the resource credit tree. In one or more embodiments of the invention, the client includes functionality to initialize one or more operations to allocate credits (i.e., allocation operations) in the resource credit tree (105). An allocation operation is a collection of instructions performed by a client for access to one or more resource units represented by credits in the resource credit tree (105). An allocation operation may be initialized by a client (e.g., client A (120), client B (125), or client C (130)) and may be for a number credits ($R_{orig}$) required by the client. In one or more embodiments of the invention, upon initializing an allocation operation, client initializes a tally of cascading credits (R) to the number of required credits ($R_{orig}$). A tally is a number of credits maintained during traversal of the resource credit tree (105) for distribution between one or more nodes along the traversal path and/or the resource object (110).

In one or more embodiments of the invention, the client includes functionality to select a leaf node of the resource credit tree (105) as a current node (C) in response to an allocation requirement. In one or more embodiments of the invention, the client is configured to select the leaf node based on a hash function. The client may use a client identifier associated with the client as an input to the hash function. The client identifier may be assigned to the client by the operating system or other entity. For example, the client identifier may be a process identifier assigned by an operating system to a thread, a processor identifier of the hardware processor executing the thread, or another identifier associated with the thread.

In one or more embodiments of the invention, client includes functionality to traverse the resource credit tree (105) in order to allocate a number of credits in response to initializing an allocation operation. The client may traverse the resource credit tree (105) along a backward traversal path from a selected leaf node to a target node (i.e., an ancestor of the selected leaf node). As the client analyzes nodes along the backward traversal path, each node may be sequentially locked until a target node with sufficient available credits (i.e., greater than or equal to the tally of cascading credits) is identified. After fulfilling the allocation operation, the client may unlock the nodes during or after any required distribution of remaining credits (from the tally of cascading credits) along the backward traversal path.

During traversal of the resource credit tree (105), in one or more embodiments of the invention, the client may lock the current node (C) and then identify a number of available credits of the current node ($C_{avail}$). The number of available credits may then be compared to the tally of cascading credits (R). If the client determines that number of available credits ($C_{avail}$) is greater than or equal to R, the client may set $C_{avail}$ equal to ($C_{avail}$-R) and then unlock the current node (C). The client may then allocate the required number of credits ($R_{orig}$) and proceed to distribute a remainder of the tally of cascading credits (if any) to one or more nodes along the backward traversal path. FIG. 4B depicts a method of distributing the remainder of R, in one or more embodiments of the invention.

In one or more embodiments of the invention, if the client determines that the number of available credits of the current node ($C_{avail}$)<R, the client may update the value of R and continue traversing the resource credit tree (105). If the traversal reaches the root node of the resource credit tree (105) and the number of available credits ($C_{avail}$) of the root node is less than R, the client may be configured to import one or more credits from the resource object (110) in order to fulfill the allocation operation. If the client determines that the count of available credits in the resource object is less than the tally of cascading credits (R), the allocation operation may be blocked at the resource object. Similarly, if the client is unable to access a node because it is locked, the operation may be blocked at the node until the node is unlocked. In one or more embodiments of the invention, if the resource management engine (100) and/or client determines that more than one operation is blocked at a node or the external resource object, the resource management engine and/or client may unblock the operation(s) according to a predefined method of selecting the blocked operation(s) (e.g., first in first out, based on a priority flag, based on the number of required credits ($R_{orig}$), etc.).

In one or more embodiments of the invention, the resource object (110) is a data structure including a count of available (non-allocated) credits in the resource pool. The resource object (110) may include any other information relevant to the count of available credits or the status of the resource pool, in accordance with various embodiments of the invention. Thus, the resource object (110) includes a count of unallocated credits not included in the resource credit tree (105) at a given point in time. In a typical example, the count of available credits in the resource object (110) is significantly larger than the total number of credits within the nodes of the resource credit tree (105). In one or more embodiments of the invention, the resource object (110) allows one or more other processes or modules (e.g., the client) in the system (199) to query the count of available credits and/or to distribute credits to and from the resource credit tree (105) in response to changing demand.

In one or more embodiments of the invention, the client includes functionality to obtain one or more credits from the resource object (110). Upon reaching the root node during traversal of the resource credit tree (105), the client may determine that the tally of cascading credits exceeds the number of available credits ($C_{avail}$) of the root node. In this case, in one or more embodiments of the invention, the client may obtain the tally of cascading credits from the resource object. After fulfilling the allocation operation, the client may transfer a remainder of the tally of cascading credits to the resource credit tree (105) according to one or more methods of distributing remaining credits.

In one or more embodiments of the invention, the client includes functionality to distribute a remainder of the tally of cascading credits to one or more nodes in the backward traversal path (after traversing the resource credit tree (105)). The client may be configured to identify each node in the backward traversal path having an available number of credits ($C_{avail}$) which is less than half of its respective capacity ($C_{avail} < (C_{max}/2)$). The client may increase the available number of credits ($C_{avail}$) of these identified nodes to ($C_{max}/2$) by transferring credits from the remainder of the tally of cascading credits (R). In one or more embodiments of the invention, the aforementioned expression "($C_{max}/2$)" may be substituted with any other fraction of the capacity ($C_{max}$) or, in some cases, the entire capacity. Specific use cases and/or applications may require adjusting this fractional amount in response to relevant performance considerations.

In one or more embodiments of the invention, the allocation operation includes a priority flag. In one or more embodiments of the invention, when an allocation operation having a priority flag is blocked at the root node, the client is configured to transfer all credits (or any predefined percentage or portion thereof) from all nodes in the resource credit tree (105) to the root node. If the client determines that the number of available credits ($C_{avail}$) of the root node (after transferring the credits) is sufficient, the allocation operation is unblocked and fulfilled from the root node. In one or more embodiments of the invention, if the client determines that the number of available credits ($C_{avail}$) of the root node (after transferring the credits) is not sufficient to fulfill the allocation operation, then the client may calculate a number of credits required to fill each leaf node in the resource credit tree (105) to its capacity ($C_{max}$).

If the resource management engine (100) and/or a client determines that the number of available credits of the root node is less than the number of credits required to fill the leaf nodes to capacity, the resource management engine (100) or the client may shrink (i.e., reduce the size of) the resource credit tree (105). In one or more embodiments of the invention, the size of the resource credit tree (105) is reduced by a factor of the fan-out number of the resource credit tree (105). The factor of the fan-out number for a regular resource credit tree (105) is the number of children per non-leaf node. The resource management engine (100) or the client may select nodes for deletion/inactivation based on any predefined method of selecting nodes (e.g., percentage allocation, any tree traversal algorithm, etc.). The process of reducing the size of the tree may be performed while continuing normal operation of the tree (allocating/freeing credits). In one or more embodiments of the invention, the resource management engine (100) or the client may shrink the resource credit tree (105) in response to prioritized allocation operations until only the root node is active.

In one or more embodiments of the invention, the allocation operation includes a reserve parameter. The reserve parameter may be a minimum count of credits in the resource object. Initially, the client may perform the backward traversal of the resource credit tree (105) and identify a node having enough credits to satisfy the allocation operation (e.g., when the number of available credits of the node exceeds the tally of cascading credits). At this point, while all nodes in the backward traversal path are locked, the client may examine the resource object (110) without locking the resource object (110). If the client determines that a count of available credits of the resource object is greater than or equal to the reserve parameter, the client proceeds with allocation of the credits and transfers the remainder of the tally of cascading credits as required. If the client determines that a count of available credits of the resource object is less than the reserve parameter, the client may determine that the allocation operation failed.

In one or more embodiments of the invention, the client includes functionality to detect that an allocation operation is blocked at the resource object (110). An operation may be blocked at the resource object if it is determined that the resource object has an insufficient count of available credits to fulfill a tally of cascading credits corresponding to the operation. Upon initializing an operation to free one or more credits to the resource credit tree (105), the client (100) may check whether any allocation operations are blocked at the resource object (110). If the client (100) determines that one or more blocked allocation operations exist, the client (100) may free the credits directly to the resource object (and bypass traversal of the resource credit tree (105)) in response to the free operation.

In one or more embodiments of the invention, the client (100) includes functionality to initialize an operation to free (i.e., de-allocate) one or more allocated credits (i.e., a free operation). A free (i.e., de-allocation) operation is an operation performed by the client to release one or more previously allocated resource units. A free operation may be performed by a client (e.g., client A (120), client B (125), or client C (130)) and may be for a number credits ($R_{orig}$) to be freed by the client. In one or more embodiments of the invention, multiple clients may access the resource credit tree concurrently. In one or more embodiments of the invention, upon initializing a free operation, client initializes a tally of cascading credits (R) to the number of required credits ($R_{orig}$).

The client may then select a leaf node of the resource credit tree as a current node (C). As described above, the selection of a leaf node may be performed using a hash function or any other method of selection, in accordance with various embodiments of the invention.

In one or more embodiments of the invention, the client includes functionality to traverse the resource credit tree (105) in order to free a number of credits in response to initializing a free operation. The client may traverse the resource credit tree (105) along a backward traversal path from a selected leaf node to a target node (i.e., an ancestor of the selected leaf node). As the client analyzes nodes along the backward traversal path, each node may be sequentially locked, balanced, and then unlocked before proceeding to the next node. The client may continue balancing nodes until the tally of cascading credits (R) is exhausted.

In one or more embodiments of the invention, the client includes functionality to balance a current node (C) during a backward traversal of the resource credit tree (105) (performed in response to initializing a free operation). First, the client may identify a number of available credits ($C_{avail}$) of the current node. Next, the client may add the tally of cascading credits (R) to the number of available credits (i.e., set $C_{avail} = C_{avail} + R$). Then, the client may determine whether the number of available credits ($C_{avail}$) exceeds the capacity ($C_{max}$) of the current node. If the client determines that the capacity is not exceeded, the client may unlock the current node and end the traversal.

If the client determines that the capacity ($C_{max}$) is exceeded, the client may unlock the current node and set $R = C_{avail} - (C_{max}/2)$ and $C_{avail} = (C_{max}/2)$. If the current node (C) is not the root node, the client may proceed with the traversal along the backward traversal path. If the current node (C) is the root node, the client may export the tally of cascading credits to the resource object. In one or more embodiments of the invention, the expression "($C_{max}/2$)" in the aforementioned formulas ($R = C_{avail} - (C_{max}/2)$ and $C_{avail} =$ ($C_{max}/2$)) may be substituted with any other fraction of the capacity ($C_{max}$) or, in some cases, the entire capacity. Specific use cases and/or applications may require adjusting this fractional amount in response to relevant performance considerations.

In one or more embodiments of the invention, the resource management engine (100) and/or client(s) include functionality to grow (i.e., increase the size of) the resource credit tree (105). In one or more embodiments of the invention, growing the resource credit tree (105) may be performed with a free operation. Specifically, when backwards traversal of the resource credit tree reaches the root node and prior to exporting a tally to the resource object, the grow operation may be performed. The resource management engine (100) and/or the client(s) may be configured to determine that a number of available credits in the root node is sufficient to fill a greater number of leaf nodes to capacity as part of the grow operation. In one or more embodiments of the invention, the grow operation is only performed when the resource credit tree is shrunk from its initial size. Upon making this determination, the resource management engine (100) or the client may grow the resource credit tree (105) by effectively reversing a shrink operation.

In one or more embodiments of the invention, the client selects the number of leaf nodes (N) in the resource credit tree and the capacity ($C_{max}$) of the leaf nodes based on application and/or performance considerations. For example, when the system (199) is implemented on a computing device with multiple CPUs, the client may set the number of leaf nodes (N) equal to the number of CPUs such that N concurrently running threads may each access a leaf without contention (assuming a perfect hash function).

Although not shown in FIG. 1, the client may access the resource allocation tree indirectly, such as via a proxy thread. For example, in a distributed computer system, the client may be a thread executing on a computer system remote from the computer system having the resource credit tree. In such a scenario, the client may perform the resource allocation operation and the free operation by sending a request to a proxy thread executing on the computer system having the resource credit tree. The proxy thread may perform the steps to allocate and/or free credits.

Figure 3:
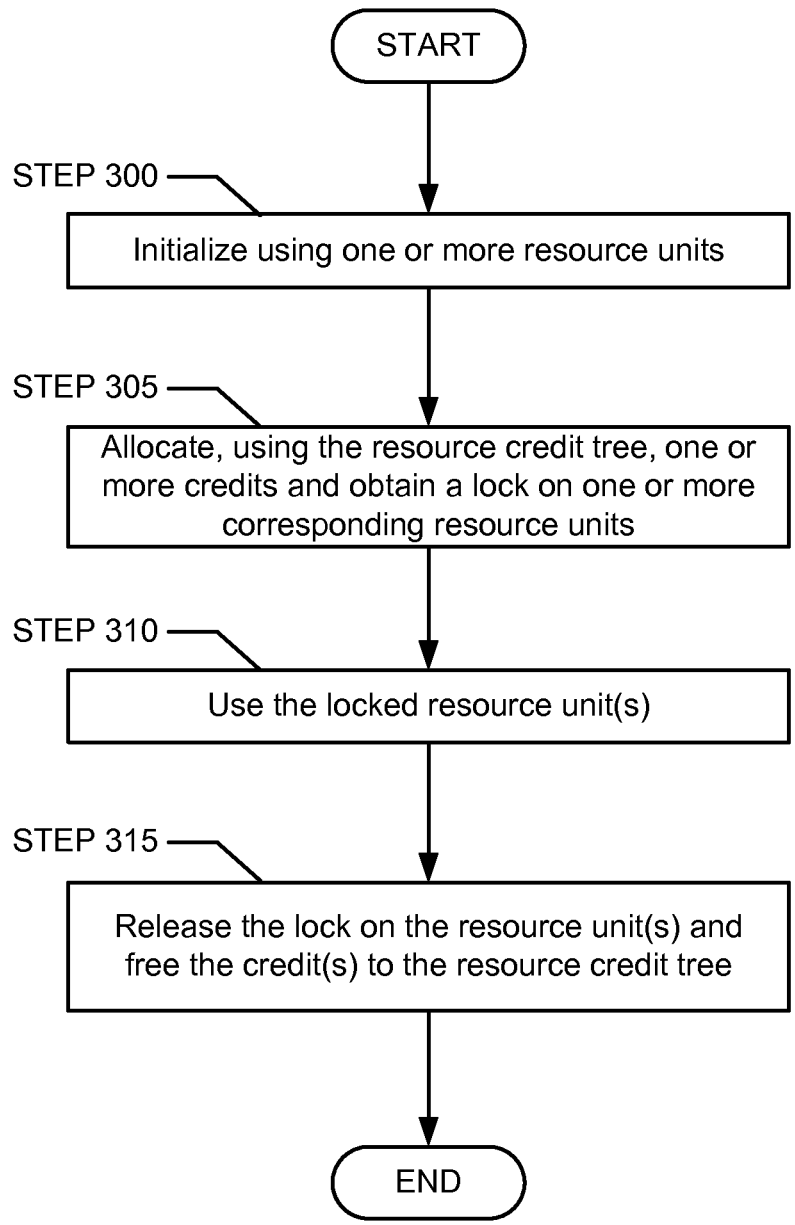
FIGS. 3, 4A, 4B, and 5 show flowcharts in accordance with one or more embodiments of the invention.

FIG. 3 shows a flowchart of a method for using one or more resource units in one or more embodiments of the invention. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, to the client initializes using one or more resource units. The one or more resource units may be shared among many clients. The client may initialize using one or more resource units by starting to execute intructions for accessing the resource credit tree. For example, if the resource credit tree is a kernel data structure and the client is a user level application, the client may make a system call to the operating system kernel. The system call transforms the user-level thread executing the client to a kernel level thread that can access the resource credit tree in one or more embodiments of the invention. As another example, if the resource credit tree is a user-level data structure, the client may begin executing instructions (discussed below) to access the resource credit tree.

In STEP 305, in one or more embodiments of the invention, one or more credits representing available resource units are allocated using the resource credit tree and the available resource units are locked in one or more embodiments of the invention. Allocating the credits from the resource credit tree may be performed, for example, as discussed below and in FIGS. 4A and 4B. By using the resource credit tree, multiple clients may simultaneously obtain credits for resources. Specifically, as discussed below and in FIGS. 4A and 4B, when the client obtains credit(s) from the resource credit tree, the client obtains a lock on one or more nodes. By having a resource credit tree, multiple clients may obtain locks on different leaf nodes and, thus, may simultaneously or semi-simultaneously obtain credits from the resource credit tree. Further, the tree structure provides a mechanism for distributing credits such that if one leaf node is accessed more than other leaf nodes, the leaf node may obtain more credits from parent nodes when required in order to continue processing credits.

In one or more embodiments of the invention, after or as part of obtaining one or more credits from the resource credit tree, the client obtains a lock on a resource unit, for each credit, from the resource pool. Thus, the resource credits limit the number of locks that may be obtained on resource units in the resource pool. The lock may be granted to the requesting client such that the client obtains an exclusive right to use the resource unit(s) while the resource unit(s) are locked (STEP 310). After obtaining the locks, the client uses the resource units in one or more embodiments of the invention.

In STEP 315, in one or more embodiments of the invention, upon completing usage of the locked resource unit(s), the client may release the resource unit(s) and an associated free operation is initialized to free the allocated credit(s) to the resource credit tree. Thus, the client may distribute credits corresponding to the released resource unit(s) back to the resource credit tree so that the newly freed credits are once again available for allocation. The credit(s) may be freed according to a specific method for freeing credits (e.g., the method of FIG. 5, discussed below). Similar to the process for allocating credits, using the resource credit tree and/or an associated method of freeing credits may reduce the possibility of lock contention among two or more competing clients.

Figure 4A:
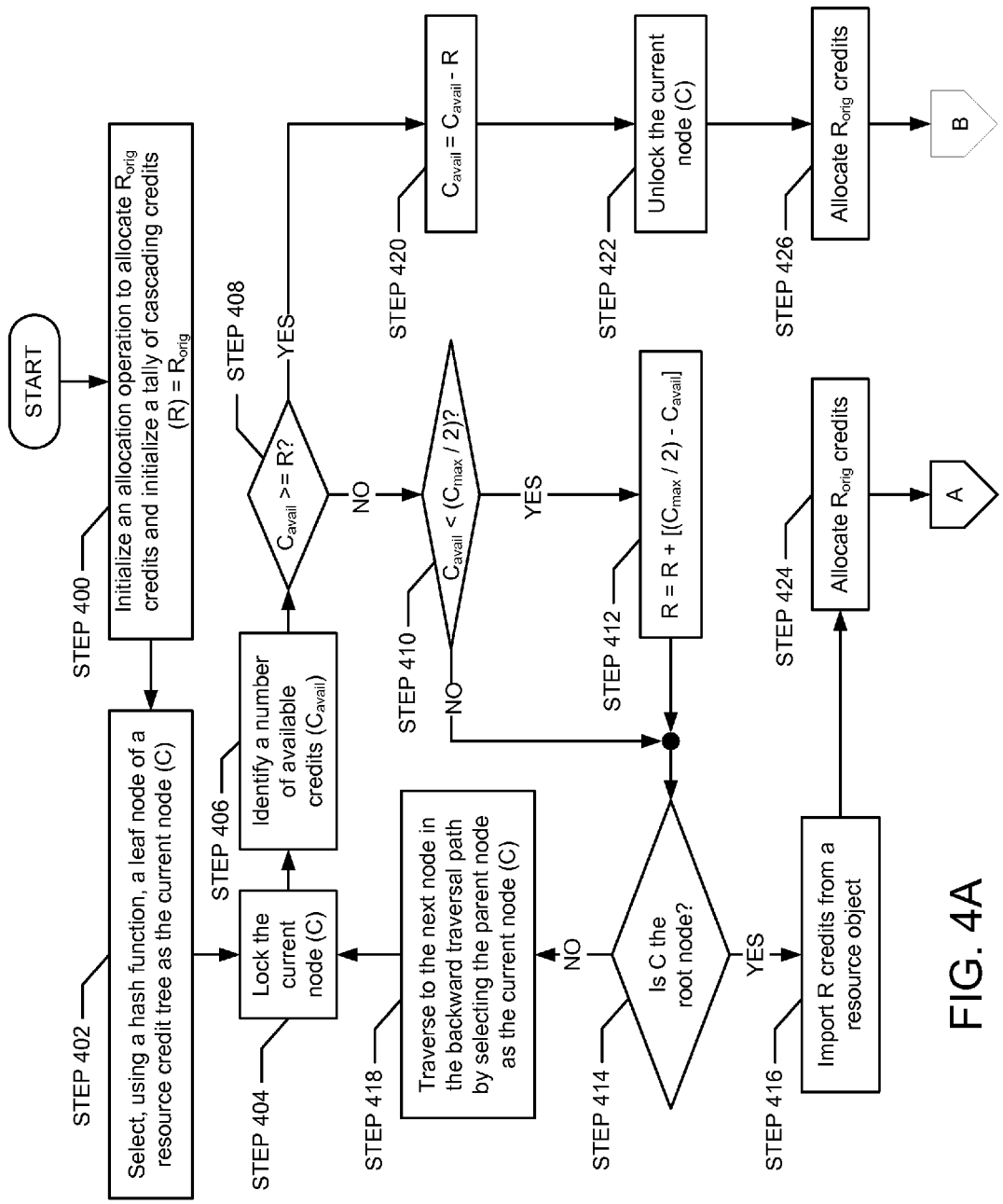
Figure 4B:
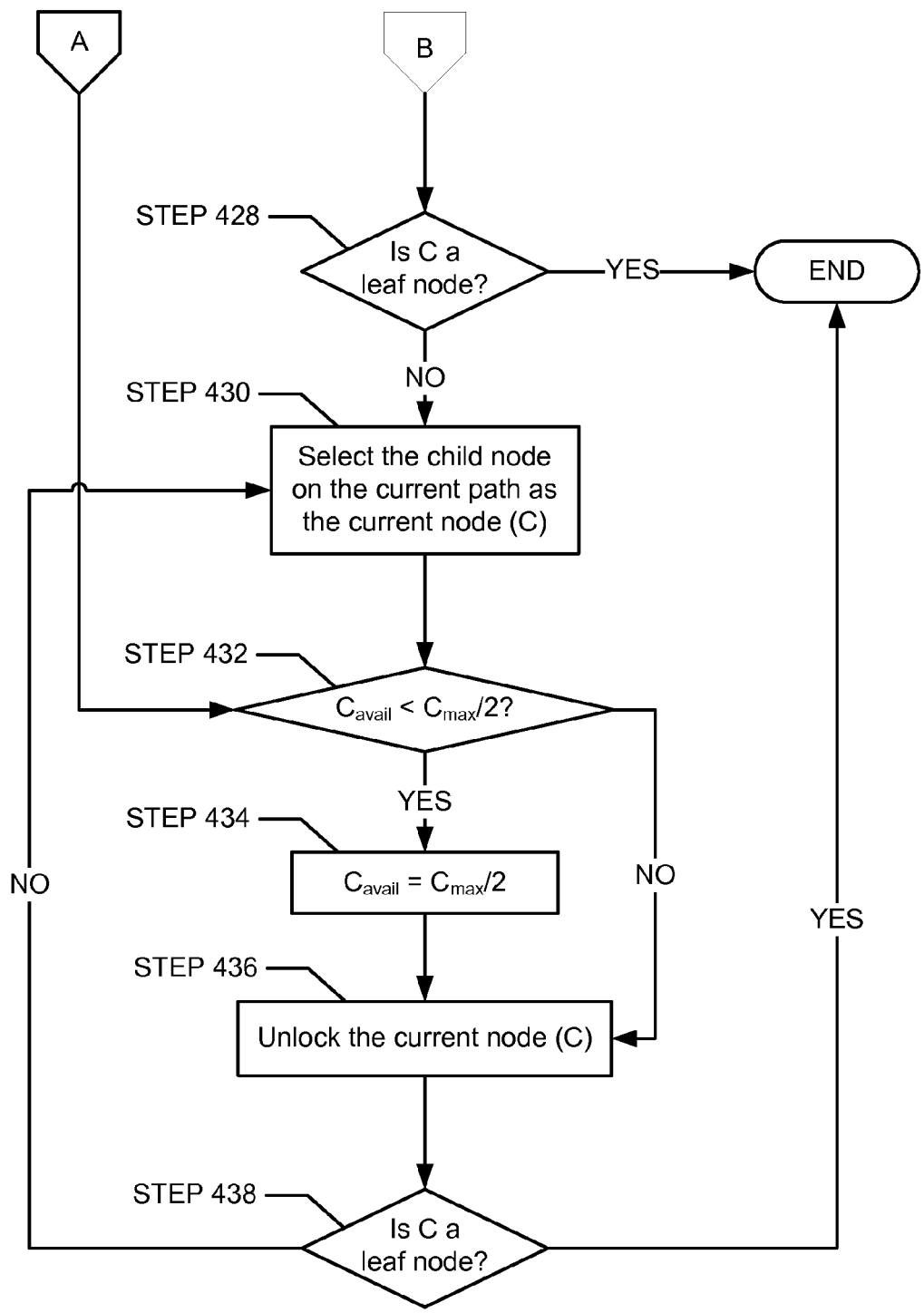

FIGS. 4A and 4B show flowcharts of a method for allocating one or more credits from a resource credit tree in response to a request. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 4A and 4B should not be construed as limiting the scope of the invention.

In STEP 400, in one or more embodiments of the invention, an allocation operation is initialized to allocate $R_{orig}$ credits. The number of $R_{orig}$ credits may be a single credit or multiple credits. As part of initializing the allocation operation, a tally of cascading credits (R) is initialized to $R_{orig}$ in one or more embodiments of the invention. In one or more embodiments of the invention, each allocation operation corresponds to a client traversing the resource credit tree. As discussed above, in a distributed computer system, a proxy thread may be used and may be initialized by the client to perform the allocation operation. Thus, the client is deemed to perform an action when the proxy thread performs the action on the client's behalf.

In STEP 402, in one or more embodiments of the invention, a leaf node of a resource credit tree is selected as the current node (C). The leaf node may be selected using a hash function and may be based on the allocation operation initialized in STEP 400. A client identifier may be entered as an input to the hash function. In one or more embodiments of the invention, a combination of unique inputs to the hash function may be used to select the leaf node.

In STEP 404, in one or more embodiments of the invention, the current node (C) is locked. A locked node is a node that only grants write privileges to the locking thread (e.g., the thread of the client).

In STEP 406, in one or more embodiments of the invention, a number of available credits ($C_{avail}$) of C is identified. The number of available credits may be any number between zero and the capacity of the current node ($C_{max}$), inclusive.

In STEP 408, in one or more embodiments of the invention, it is determined whether the number of available credits ($C_{avail}$) is greater than or equal to the tally of cascading credits (R). If it is determined that $C_{avail} \geq R$, the process proceeds to STEP 420. If it is determined that $C_{avail} < R$, the process proceeds to STEP 410.

In STEP 410, in one or more embodiments of the invention, it is determined whether the number of available credits ($C_{avail}$) is less than half of the capacity of the current node ($C_{max}/2$). If it is determined that $C_{avail} < (C_{max}/2)$, the process proceeds to STEP 412. If it is determined that $C_{avail} \geq (C_{max}/2)$, the process proceeds to STEP 414.

In STEP 412, in one or more embodiments of the invention, the tally of cascading credits (R) is set equal to $R+[(C_{max}/2)-C_{avail}]$. With regard to STEPS 410, 412, 432, and 434, as discussed above with regard to FIG. 1, any fraction of the capacity ($C_{max}$) or the entire capacity may be used in place of $C_{max}/2$, in accordance with various embodiments of the invention.

In STEP 414, in one or more embodiments of the invention, it is determined whether the current node (C) is the root node of the resource credit tree. If it is determined that C is the root node, the process proceeds to STEP 416. If it is determined that C is not the root node, the process proceeds to STEP 418.

In STEP 416, in one or more embodiments of the invention, R credits are imported from a resource object. Importing credits from the resource object may involve simply reducing the count of available credits in the resource object by a specified amount (e.g., R). The specified amount may be added to the root node or stored temporarily while STEPS 428 to 438 are performed. In STEP 418, in one or more embodiments of the invention, the parent node of the current node (C) is selected as the current node (C).

In STEP 420, in one or more embodiments of the invention, the number of available credits ($C_{avail}$) is set equal to $C_{avail}-R$. Thus, the tally of cascading credits is reduced from the current node and at least a portion thereof is used to allocate the required number of credits ($R_{orig}$) in STEP 426. After allocating the required number of credits ($R_{orig}$), a remainder of the tally of cascading credits may be distributed to one or more nodes in the backward traversal path in STEPS 428-438 in FIG. 4B.

In STEP 422, in one or more embodiments of the invention, the current node (C) is unlocked. Unlocking the current node (C) may include removing exclusive access from the current allocation operation.

In STEPS 424 and 426, in one or more embodiments of the invention, $R_{orig}$ credits are allocated in response to the allocation operation initialized in STEP 400. Allocating the required number of credits ($R_{orig}$) may be performed prior to or in conjunction with STEP 422 or STEPS 432-436, in accordance with various embodiments of the invention.

FIG. 4B shows a flowchart depicting a continuation of the method described with regard to FIG. 4A (above) for allocating one or more credits from a resource credit tree in response to initializing an allocation operation.

In step 428, in one or more embodiments of the invention, it is determined whether the current node (C) is a leaf node. If it is determined that C is a leaf node, the process ends. If it is determined that C is not a leaf node, the process proceeds to STEP 430.

In STEP 430, in one or more embodiments of the invention, the next child node on the current path is selected as the current node (C). Thus, the resource credit tree may be forward traversed in STEPS 428-438. Alternatively, in one or more embodiments of the invention, one or more of STEPS 428-438 may be performed in parallel.

In STEP 432, in one or more embodiments of the invention, it is determined whether the number of available credits ($C_{avail}$) is less than half of the capacity ($C_{max}$). If it is determined that $C_{avail} < (C_{max}/2)$, the process proceeds to STEP 434. If it is determined that $C_{avail} \geq (C_{max}/2)$, the process proceeds to STEP 436.

In one or more embodiments of the invention, the number of available credits ($C_{avail}$) is then set equal to ($C_{max}/2$) (STEP 434). Next, in one or more embodiments of the invention, the current node (C) is unlocked (STEP 436).

In STEP 438, it is determined whether the current node is a leaf node of the resource credit tree. If it is determined that the current node is a leaf node, the process ends. If it is determined that the current node is not a leaf node, the process proceeds to STEP 430.

In one or more embodiments of the invention, the capacity ($C_{max}$) of the leaf nodes may be selected to be large enough to give good performance, but small enough so that the tree caches a small fraction F of the total credits. For example, given a resource credit tree with a fan-out equal to 4, the resource credit tree may include at most $C_{max}*N*(\log_2(N)/2+1)$ credits, where N is a number of leaf nodes in the resource credit tree. Resources on a server may scale linearly with the number of CPUs, so total credits may be approximated as $M*N$. In one or more embodiments of the invention, to guarantee that the tree caches less than a fraction F, the following condition may be required: $(C_{max}*N*(\log_2(N)/2+1))/(M*N)<F$. Solving for $C_{max}$ gives $C_{max}<(F*M)/(\log_2(N)/2+1)$. For example, consider using credits to represent free pages of memory on a server with N=256 CPUs, 8 GB of memory per CPU, and a page size of 8 KB. Using a target fraction F=0.001, $C_{max}$ may be selected such that $C_{max}<(0.001*(8 \text{ GB}/8 \text{ KB}))/(\log2(256)/2+1) \rightarrow C_{max}<200$.

Figure 5:
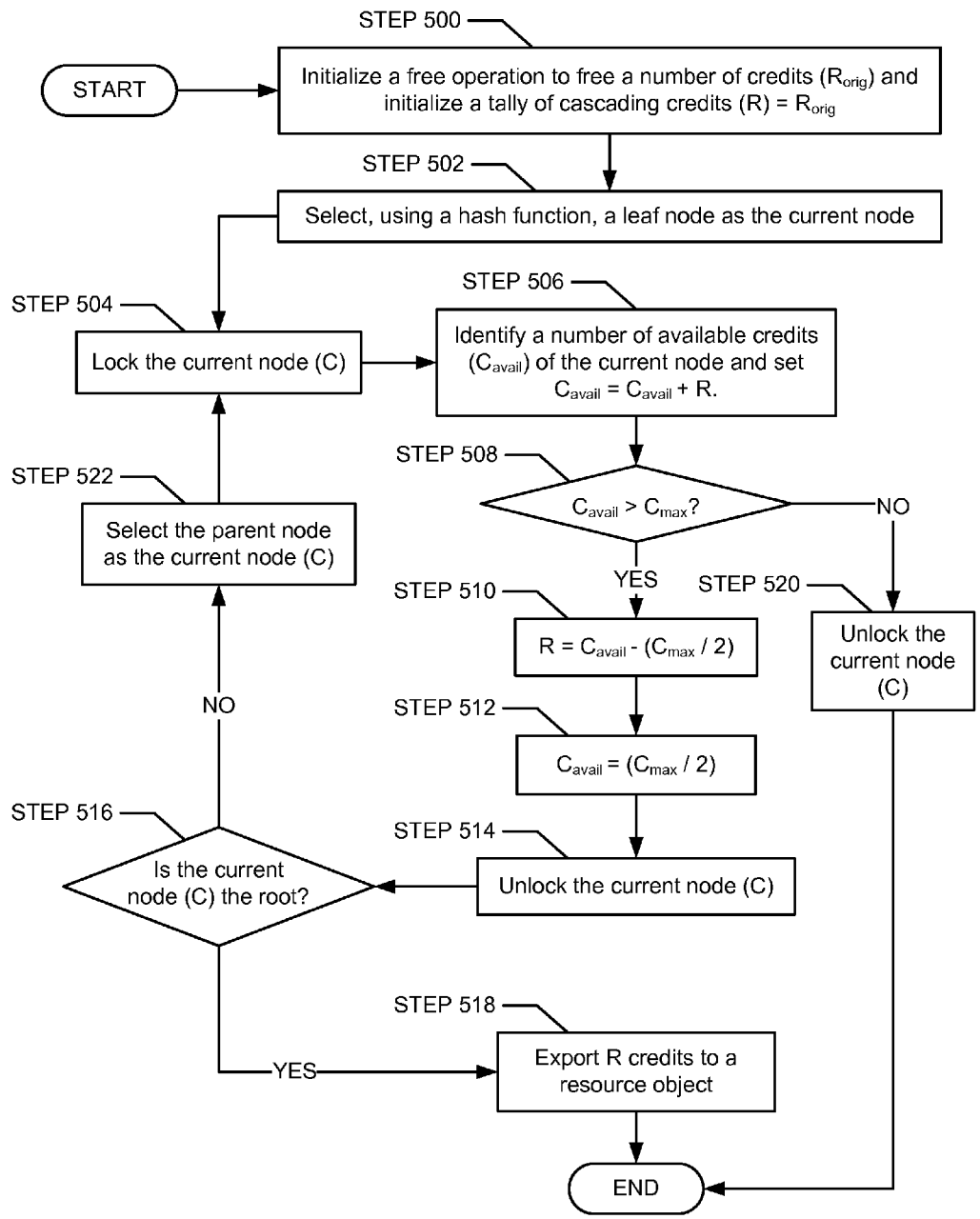

FIG. 5 shows a flowchart of a method for freeing one or more credits to a resource credit tree in response to initializing a free operation. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 5 should not be construed as limiting the scope of the invention.

In STEP 500, in one or more embodiments of the invention, a free operation to free a number of credits ($R_{orig}$) is initialized. The number of $R_{orig}$ credits may be a single credit or multiple credits. As part of initializing the free operation, a tally of cascading credits (R) is initialized to $R_{orig}$.

In STEP 502, in one or more embodiments of the invention, a leaf node of a resource credit tree is selected as the current node (C). The leaf node may be selected using a hash function (e.g., taking the client identifier as input) and may be based on the free operation initialized in STEP 500.

In one or more embodiments of the invention, the current node (C) is locked (STEP 504) and then a number of available credits of the current node ($C_{avail}$) is set equal to $C_{avail}$+R (STEP 506).

In STEP 508, in one or more embodiments of the invention, it is determined whether the number of available credits ($C_{avail}$) is greater than a capacity of the current node ($C_{max}$). If it is determined that $C_{avail} > C_{max}$, the process proceeds to STEP 510. If it is determined that $C_{avail} \leq C_{max}$, the process proceeds to STEP 520.

In STEP 510, in one or more embodiments of the invention, the tally of cascading credits (R) is set equal to $C_{avail}$−($C_{max}$/2). As discussed in regard to FIG. 1 above, any fraction of the capacity ($C_{max}$) or the entire capacity may be used in place of $C_{max}$/2 in STEPS 510 and 512.

Next, in one or more embodiments of the invention, the number of available credits ($C_{avail}$) is set equal to ($C_{max}$/2) (STEP 512) and then the current node is unlocked (STEP 514).

In STEP 516, in one or more embodiments of the invention, it is determined whether the current node (C) is the root node of the resource credit tree. If it is determined that C is the root node, the process proceeds to STEP 518. If it is determined that C is not the root node, the process proceeds to STEP 522.

In STEP 518, in one or more embodiments of the invention, R credits are exported to the resource object. Exporting the R credits to the resource object may involve simply increasing a count of available credits in the resource object by R.

Next, in one or more embodiments of the invention, the current node (C) is unlocked (STEP 520) and the parent node of the current node (C) is selected as the current node (C) (STEP 522).

In one or more embodiments of the invention, the resource credit tree serves as an accumulator. In particular, the accumulator may be used to determine the number of times that a client or a set of clients uses a resource. As an accumulator, credits are not allocated from the resource credit tree. However, every time that the client uses a resource, the client initializes a free operation (e.g., performs the Steps of FIG. 5). A management program or agent may identify the number of times that the client uses the resource using resource credit tree. In this example, the value of $C_{avail}$ at the root is the accumulated sum. Accumulators may have a wide variety of uses, such as accumulating resource usage for a multi-threaded process. In such an example, each thread is a separate client. In another example, the resource credit tree may accumulate a running total of aggregate CPU time after a thread runs on a CPU for one time quantum. In the example, each time the thread runs for one time quantum, the thread adds a credit to the resource credit tree (e.g., by performing the Steps of FIG. 5). The resource credit tree maintains a count of the number of time quantums of CPU time that the client has used.

In one or more embodiments of the invention, the resource credit tree is used as a reference counter. Reference counting may be used in a wide variety of applications to track the number of references that one or more threads have to a shared entity, such as a file, a device, or any shared data structure. In one or more embodiments of the invention, when using the resource credit tree as a reference counter, allocating a credit is equivalent to adding a reference, and freeing a credit removes a reference.

The following section describes various examples of the invention. The examples are included to aid in the understanding of the invention but are not intended to limit the scope of the invention.

Figure 6A:
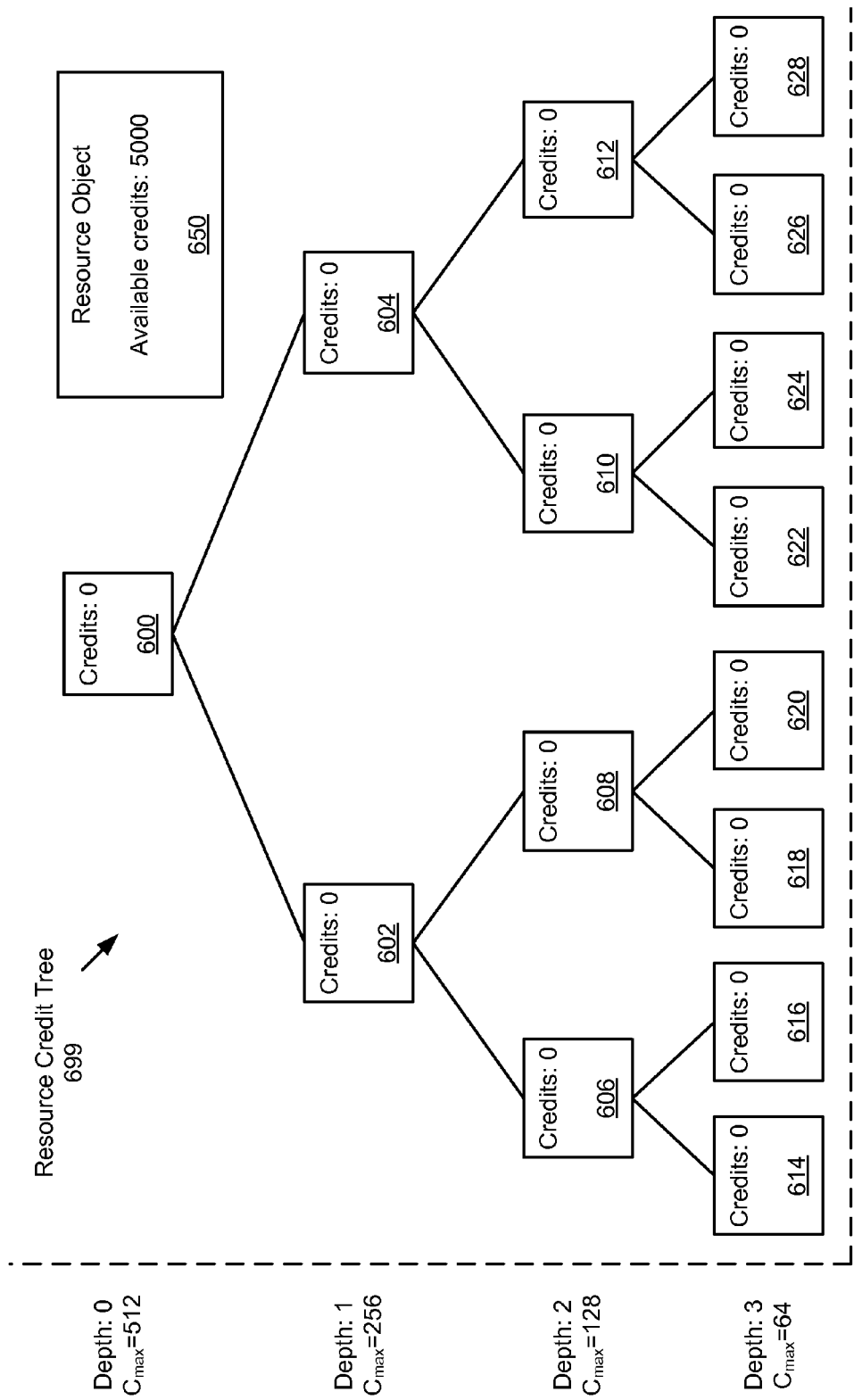
FIGS. 6A-6C show an example resource credit tree in accordance with one or more embodiments of the invention.
Figure 6B:
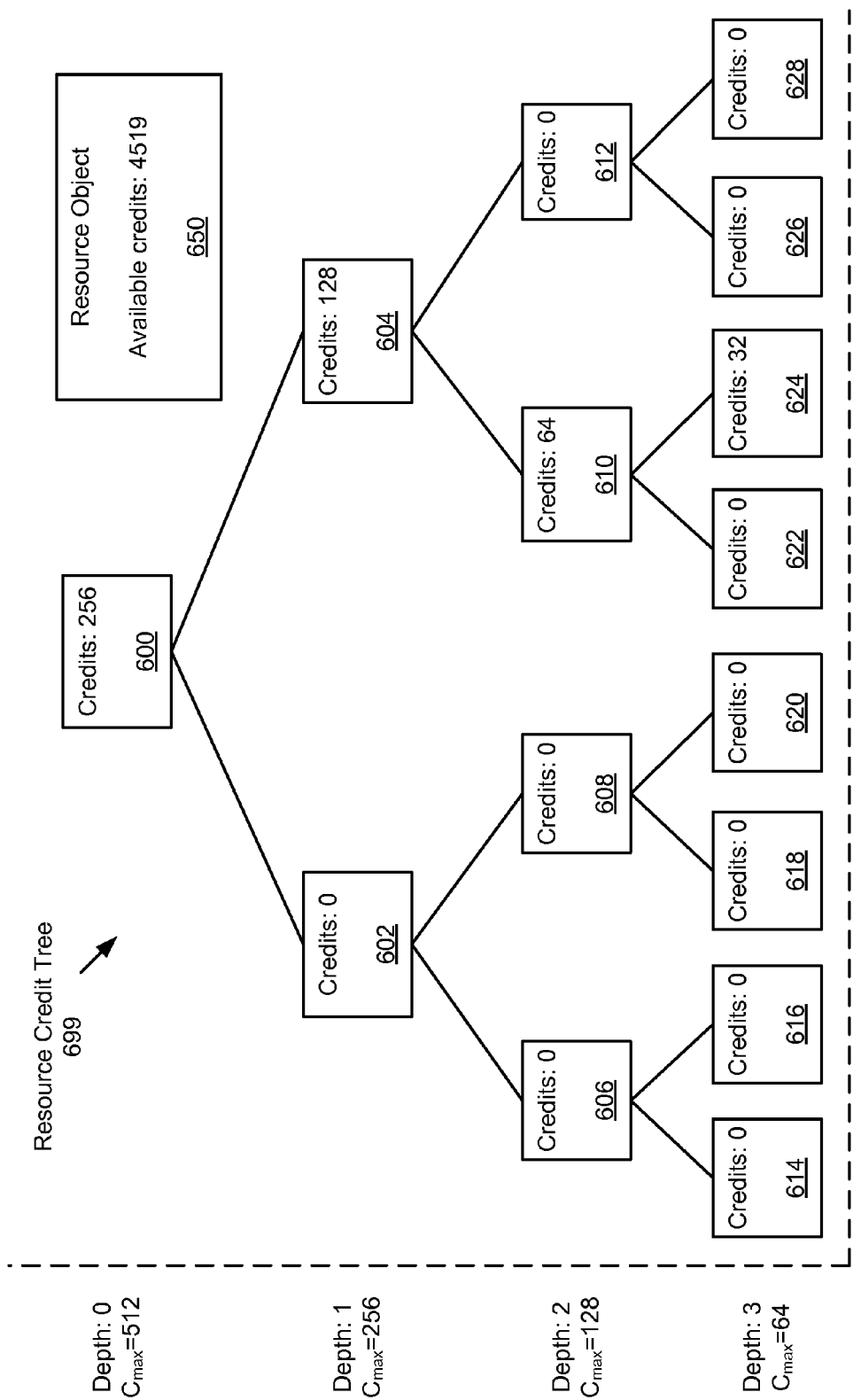
Figure 6C:
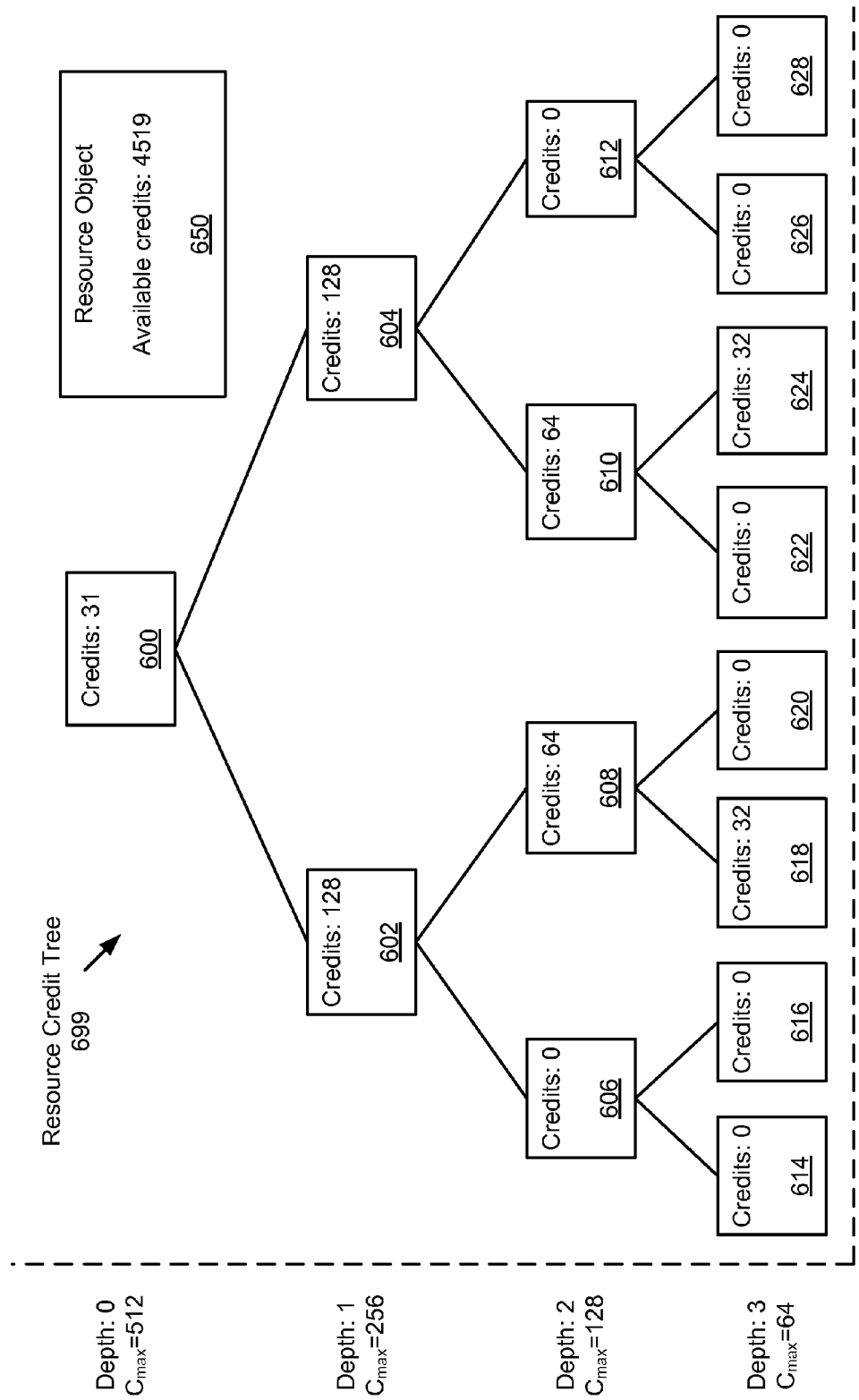

In a first example, FIGS. 6A-6C show a resource credit tree (699) in accordance with one or more embodiments of the invention. As depicted by FIG. 6A, the resource credit tree is initialized with zero credits in each node, 8 leaf nodes, and a capacity ($C_{max}$) of 64 credits at each leaf node. Initially, the count of available credits of the resource object is 5000. After initializing the resource credit tree, a first thread initializes an allocation operation to allocate a single credit ($R_{orig}$=1). The process identifier (ID) of the first thread is identified. The first thread uses the process ID as an input to a hash function in order to select a leaf node of the resource credit tree (699). The hash function selects leaf node (624) as the current node (C) and initializes a tally of cascading credits (R) to 1 (i.e., the value of $R_{orig}$).

Continuing the example, the first thread traverses the resource credit tree (699) as follows:

First, the resource management engine locks the current node (624) and detects that the count of available credits of the current node ($C_{avail}$) is zero. The resource management engine determines that the number of available credits is less than R and that $C_{avail} < (C_{max}/2) \rightarrow 0 < 32$. As a result, the tally of cascading credits (R) is increased to $R+[(C_{max}/2)-C_{avail}] \rightarrow 1+[(64/2)-0]=33$. Next, the resource management engine traverses to the next node in the backward traversal path by selecting the parent node (610) of the current node (624) as the new current node (C).

The resource management engine then locks the current node (610) and identifies a number of available credits of the current node (again, $C_{avail}$=0) and determines that the number of available credits is less than R and that $C_{avail} < (C_{max}/2) \rightarrow 0 < 64$. As a result, the tally of cascading credits (R) is increased to $R+[(C_{max}/2)-C_{avail}] \rightarrow 33+[(128/2)-0]=97$. The resource management engine then traverses to the next node in the backward traversal path by selecting the parent node (604) of the current node (610) as the new current node (C).

The resource management engine then locks the current node (604) and identifies a number of available credits of the current node (again, $C_{avail}$=0) and determines that the number of available credits is less than R and that $C_{avail} < (C_{max}/2) \rightarrow 0 < 128$. As a result, the tally of cascading credits (R) is increased to $R+[(C_{max}/2)-C_{avail}] \rightarrow 97+[(256/2)-0]=225$. The resource management engine then traverses to the next node in the backward traversal path by selecting the parent node (600) of the current node (604) as the new current node (C).

The resource management engine then locks the current node (600) and identifies a number of available credits of the current node (again, $C_{avail}$=0) and determines that the number of available credits is less than R and that $C_{avail} < (C_{max}/2) \rightarrow 0 < 256$. As a result, the tally of cascading credits (R) is increased to $R+[(C_{max}/2)-C_{avail}] \rightarrow 225+[(512/2)-0]=481$. The resource management engine then determines that the current node is the root node (600) of the resource credit tree (699). In response to determining that the current node is the root node (600), the resource management engine imports 481 credits from the resource object and the count of available credits of the resource object is reduced to 5000−481=4519. Next, the required number of credits ($R_{orig}$=1) is allocated and the remainder of the tally of cascading credits (R=480) is distributed to the nodes in the backward traversal path as follows:

The resource management engine determines that $C_{avail} < (C_{max}/2)$ for the root node (600). As a result, the resource management sets $C_{avail} = (C_{max}/2) = 256$. The root node (600) is unlocked and the resource management engine selects the next child in the backward traversal path as the current node (C), setting $C_{avail} = (C_{max}/2) = 128$. Each remaining node in the backward traversal path is similarly set to half of its capacity $(C_{max}/2)$ and unlocked (sequentially). FIG. 6B depicts the resource credit tree (699) after the remainder of the tally of cascading credits is distributed to the remaining nodes.

Continuing the example, a second thread initializes a second allocation request to allocate a single credit and initializes the tally of cascading credits (R) to 1. The process ID of the second thread is used as an input to the hash function and leaf node 618 is selected as the current node (C). Upon selecting the leaf node (618), the resource credit tree (699) is traversed as follows:

First, the second thread locks the current node (618) and detects that the count of available credits of the current node $(C_{avail})$ is zero. The second thread determines that the number of available credits is less than R and that $C_{avail} < (C_{max}/2) \rightarrow 0 < 32$. As a result, the tally of cascading credits (R) is increased to $R + [(C_{max}/2) - C_{avail}] \rightarrow 1 + [(64/2) - 0] = 33$. Next, the second thread traverses to the next node in the backward traversal path by selecting the parent node (608) of the current node (618) as the new current node (C).

The second thread then locks the current node (608) and identifies a number of available credits of the current node (again, $C_{avail} = 0$) and determines that the number of available credits is less than R and that $C_{avail} < (C_{max}/2) \rightarrow 0 < 64$. As a result, the tally of cascading credits (R) is increased to $R + [(C_{max}/2) - C_{avail}] \rightarrow 33 + [(128/2) - 0] = 97$. The second thread then traverses to the next node in the backward traversal path by selecting the parent node (602) of the current node (608) as the new current node (C).

The second thread then locks the current node (602) and identifies a number of available credits of the current node (again, $C_{avail} = 0$) and determines that the number of available credits is less than R and that $C_{avail} < (C_{max}/2) \rightarrow 0 < 128$. As a result, the tally of cascading credits (R) is increased to $R + [(C_{max}/2) - C_{avail}] \rightarrow 97 + [(256/2) - 0] = 225$. The second thread then traverses to the next node in the backward traversal path by selecting the parent node (600) of the current node (602) as the new current node (C). As a result, the root node (600) is now selected as the current node.

The second thread then locks the root node (600) and identifies a number of available credits of the root node ($C_{avail} = 256$) and determines that the number of available credits is greater than R (256>225). As a result, the available number of credits of the root node ($C_{avail}$) is reduced by R ($C_{avail} = C_{avail} - R$) (i.e., 256−225=31). The root node is then unlocked and the single requested credit is allocated to the second thread. The remainder of the tally of cascading credits (225−1=224, after allocating the single credit) is distributed to the remaining nodes in the backward traversal path as follows:

The second thread selects the next child node (602) in the path as the current node (C) and determines that $C_{avail} < (C_{max}/2) \rightarrow 0 < 128$. As a result, the second thread sets $C_{avail} = (C_{max}/2) = 128$. The current node (602) is then unlocked and the second thread selects the next child (608) in the backward traversal path as the current node (C) and determines that $C_{avail} < (C_{max}/2) \rightarrow 0 < 64$. As a result, the second thread sets $C_{avail} = (C_{max}/2) = 64$. The current node (608) is then unlocked and the second thread selects the next child (618) in the backward traversal path as the current node (C) and determines that $C_{avail} < (C_{max}/2) \rightarrow 0 < 32$. As a result, the second thread sets $C_{avail} = (C_{max}/2) = 32$, and unlocks the current node (618). As this point, the remainder of the tally of cascading credits is completely distributed and, because the current node is a leaf node, the second thread determines that the allocation process is complete. FIG. 6C depicts the resource credit tree (699) after completion of the allocation process.

Figure 7A:
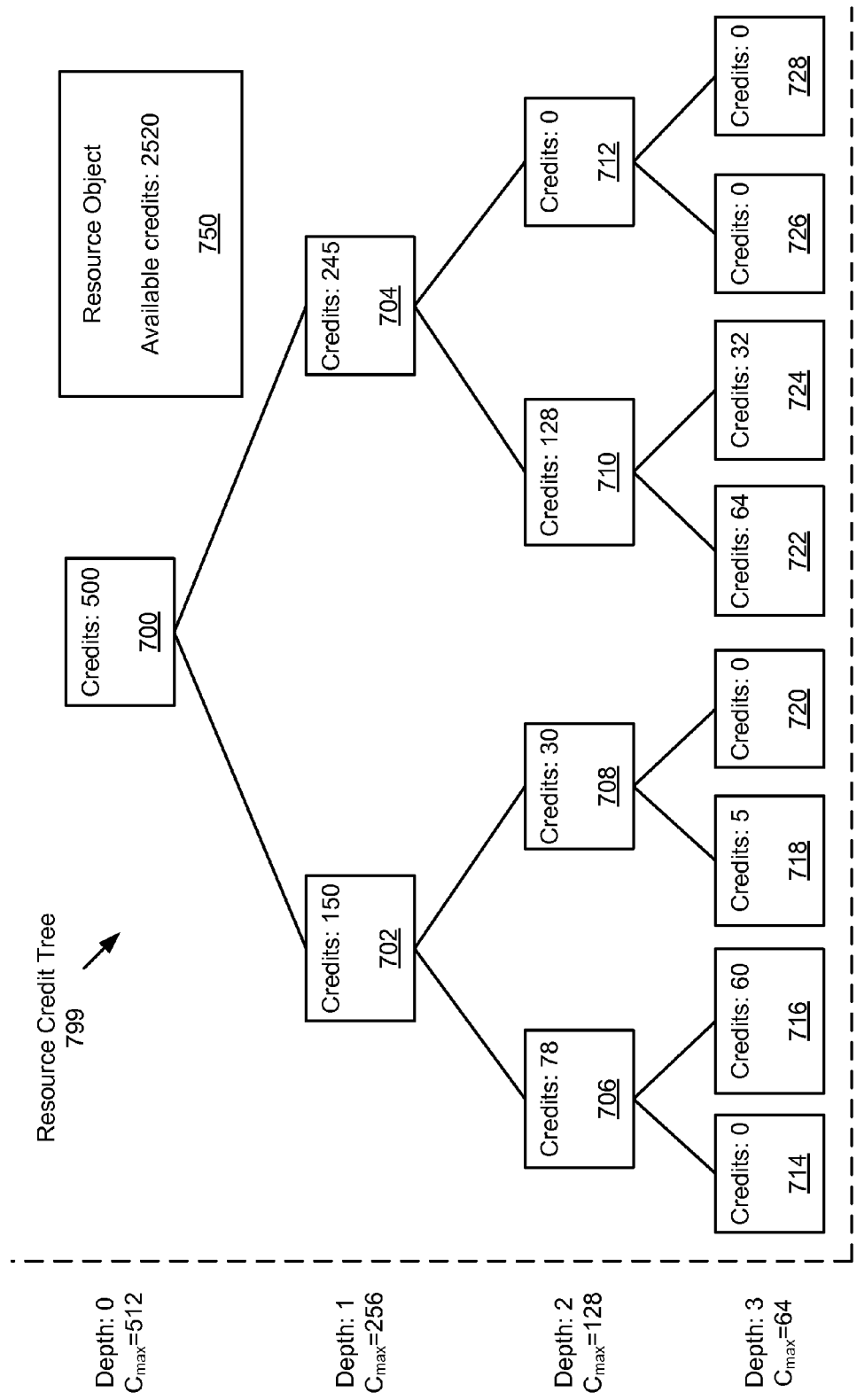
FIGS. 7A and 7B show an example resource credit tree in accordance with one or more embodiments of the invention.
Figure 7B:
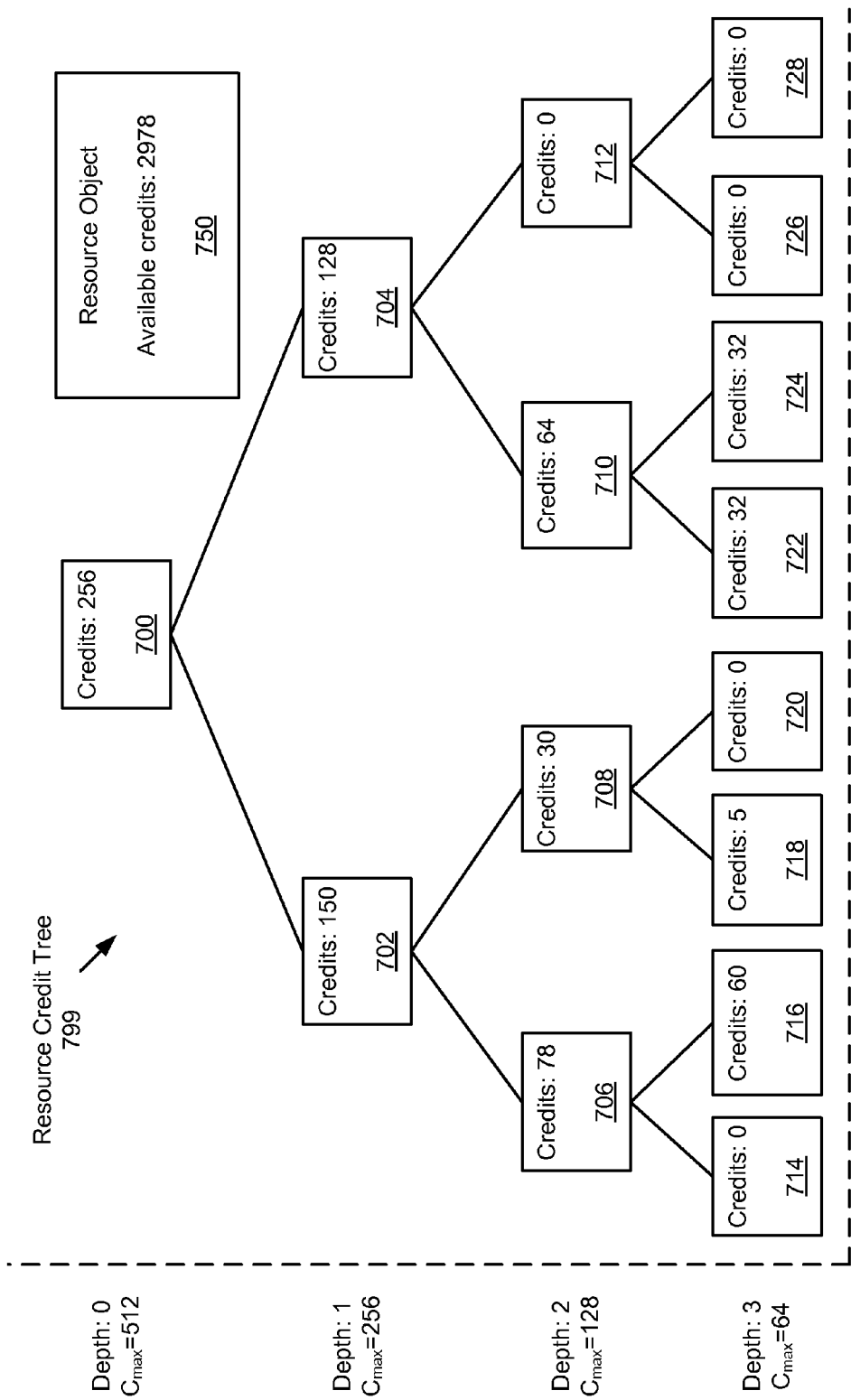

FIGS. 7A and 7B show an example resource credit tree in accordance with one or more embodiments of the invention.

In a second example, FIGS. 7A and 7B show a resource credit tree (799) in accordance with one or more embodiments of the invention. FIG. 7A depicts a state of the resource credit tree (799) prior to receiving a free request. As depicted by FIG. 7A, the resource credit tree (799) has a capacity ($C_{max}$) of 64 credits at each leaf node and the count of available credits of the resource object is 2520.

Continuing the example, a first thread initializes a free operation to free a single credit ($R_{orig} = 1$) from a first thread. The process identifier (ID) of the first thread is identified. The process ID is used as an input to a hash function in order to select a leaf node of the resource credit tree (799). The hash function selects leaf node 722 as the current node (C) and initializes a tally of cascading credits (R) to 1 (i.e., the value of $R_{orig}$).

Continuing the example, the first thread traverses the resource credit tree (799) as follows:

First, the first thread locks the current node (722) and then identifies a number of available credits of the current node ($C_{avail}$). The first thread sets $C_{avail} = C_{avail} + R = 64 + 1 = 65$. The first thread then determines that $C_{avail} > C_{max} \rightarrow 65 > 64$. Based on determining that $C_{avail} > C_{max}$, the first thread sets $R = C_{avail} - (C_{max}/2) = 65 - 32 = 33$ and sets $C_{avail} = (C_{max}/2) = (64/2) = 32$. The current node (722) is then unlocked and the parent node (710) is selected as the current node (C).

Next, the first thread locks the current node (710) and then identifies a number of available credits of the current node ($C_{avail}$). The first thread sets $C_{avail} = C_{avail} + R = 128 + 33 = 161$. The first thread then determines that $C_{avail} > C_{max} \rightarrow 161 > 128$. Based on determining that $C_{avail} > C_{max}$, the first thread sets $R = C_{avail} - (C_{max}/2) = 161 - (128/2) = 161 - 64 = 97$ and sets $C_{avail} = (C_{max}/2) = (128/2) = 64$. The current node (710) is then unlocked and the parent node (704) is selected as the current node (C).

Next, the first thread locks the current node (704) and then identifies a number of available credits of the current node ($C_{avail}$). The first thread sets $C_{avail} = C_{avail} + R = 245 + 97 = 342$. The first thread then determines that $C_{avail} > C_{max} \rightarrow 342 > 256$. Based on determining that $C_{avail} > C_{max}$, the first thread sets $R = C_{avail} - (C_{max}/2) = 342 - (256/2) = 342 - 128 = 214$ and sets $C_{avail} = (C_{max}/2) = (256/2) = 128$. The current node (704) is then unlocked and the parent node (700) (i.e., the root node) is selected as the current node (C).

Next, the first thread locks the root node (700) and then identifies a number of available credits of the root node ($C_{avail}$). The first thread sets $C_{avail} = C_{avail} + R = 500 + 214 = 714$. The first thread then determines that $C_{avail} > C_{max} \rightarrow 714 > 512$. Based on determining that $C_{avail} > C_{max}$, the first thread sets $R = C_{avail} - (C_{max}/2) = 714 - (512/2) = 714 - 256 = 458$ and sets $C_{avail} = (C_{max}/2) = (512/2) = 256$. The root node (700) is then unlocked and the tally of cascading credits is exported to the resource object. Thus, the count of available credits of the resource object is increased to 2520+458=2978, as depicted by FIG. 7B.

Figure 8:
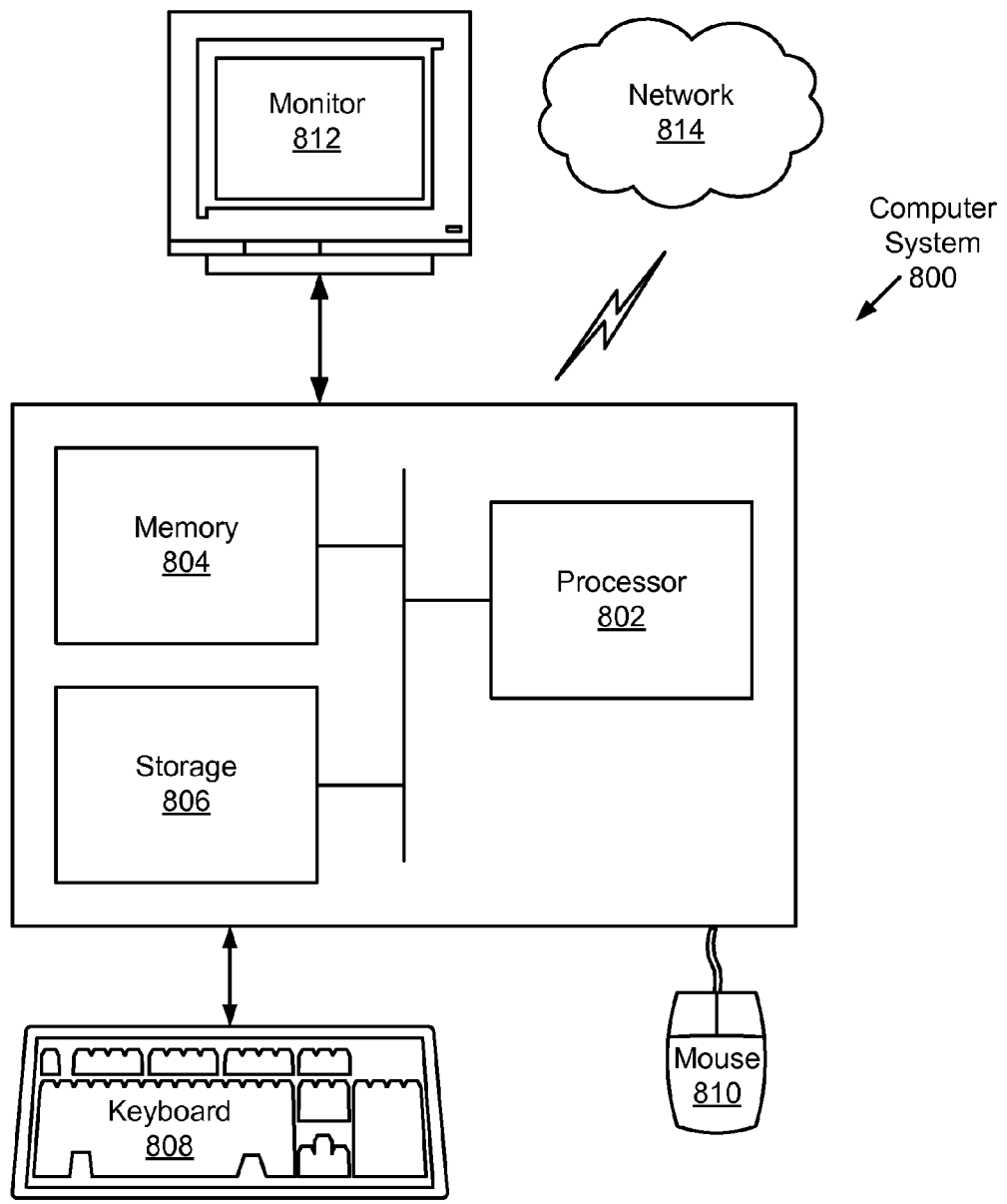
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) (such as a central processing unit (CPU), integrated circuit, hardware processor, etc.), associated memory (804) (e.g., RAM, cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Many different types of computer systems exist, now or in the future, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g., resource object (110), resource credit tree (105), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a memory, or any other tangible computer readable storage device.

In one or more embodiments of the invention, by allocating and freeing resources using a resource credit tree, it may be possible to increase resource utilization, decrease contention among concurrently running threads, and/or decrease operational latency for requests.

Additionally, in one or more embodiments of the invention, by increasing and/or decreasing the size of a resource credit tree in response to fluctuating demand, it may be possible to perform dynamic load balancing of the resource credit tree. Continuous redistribution of credits in the resource credit tree may also improve credit balancing in the tree and improve the performance of resource allocation and de-allocation operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resource management, comprising:
    initializing a first operation to allocate a first number of credits corresponding to at least one resource unit in resource pool;
    initializing a first tally of cascading credits to the first number of credits;
    selecting, using a hash function, a first leaf node of a resource credit tree;
    identifying a number of available credits of the first leaf node;
    determining, by a computer processor, that the first tally of cascading credits exceeds the number of available credits of the first leaf node;
    traversing, beginning at the first leaf node, the resource credit tree through a first backward traversal path to a first non-leaf node of the resource credit tree;
    modifying, while traversing the resource credit tree, the first tally of cascading credits based on a first number of credits and a predefined capacity of at least one node of a first plurality of nodes in the first backward traversal path, wherein the first backward traversal path comprises the first leaf node, the first non-leaf node, and a second non-leaf node;
    identifying a number of available credits of the first non-leaf node;
    determining, by the computer processor, that the number of available credits of the first non-leaf node exceeds the first tally of cascading credits; and
    allocating, to a client and from the first non-leaf node, the first number of credits in response to determining that the number of available credits of the first non-leaf node exceeds the first tally of cascading credits.

2. The method of claim 1, wherein calculating the first tally of cascading credits is based on a plurality of predefined capacities of the first plurality of nodes in the first backward traversal path, wherein the plurality of predefined capacities comprises the predefined capacity of the at least one node.

3. The method of claim 1, further comprising:
    transferring, after allocating the first number of credits from the first non-leaf node, a remainder of the first tally of cascading credits to a plurality of other nodes among the first plurality of nodes.

4. The method of claim 1, further comprising:
    initializing a second operation to allocate a second number of credits corresponding to the resource pool;
    traversing, beginning at a second leaf node, the resource credit tree through a second backward traversal path to a root node of the resource credit tree;
    calculating, while traversing the resource credit tree, a second tally of cascading credits based on a predefined capacity of each of a second plurality of nodes in the second backward traversal path, wherein the second backward traversal path comprises the second leaf node and the root node;
    identifying a number of available credits of the root node;
    determining that the second tally of cascading credits exceeds the number of available credits of the root node;
    identifying a resource object comprising a count of additional available credits of the resource pool, wherein the additional available credits are not in the resource credit tree;
    determining that the count of additional available credits exceeds the second tally of cascading credits; and obtaining, after determining that the count of additional available credits exceeds the second tally of cascading credits, the second tally of cascading credits from the resource object.

5. The method of claim 1, further comprising:
initializing a second operation to allocate a second number of credits corresponding to the resource pool, wherein the second operation comprises a priority flag;
traversing, beginning at a second leaf node, the resource credit tree through a second backward traversal path to a root node;
identifying a number of available credits of the root node;
determining that the second number of credits exceeds the number of available credits of the root node;
identifying a resource object comprising a count of additional available credits of the resource pool;
determining that the second number of credits exceeds the count of additional available credits; and
transferring, based on the priority flag and after determining that the second number of credits exceeds the count of additional available credits, all available credits in the resource credit tree to the root node.

6. The method of claim 5, further comprising:
calculating, after transferring all available credits, an updated available number of credits of the root node;
determining that the second number of credits exceeds the updated available number of credits;
identifying a fan-out number of the resource credit tree; and
removing, after determining that the second number of credits exceeds the updated available number of credits, a second plurality of nodes from the resource credit tree based on a factor of the fan-out number.

7. The method of claim 5, further comprising:
calculating, after transferring all available credits, an updated available number of credits of the root node;
determining that the updated available number of credits exceeds the second number of credits; and
allocating the second number of credits.

8. The method of claim 1, further comprising:
calculating an updated available number of credits of the root node;
determining that the updated available number of credits is sufficient to fill a second plurality of nodes;
identifying a fan-out number of the resource credit tree; and
adding, after determining that the updated available number of credits is sufficient to fill the second plurality of nodes, the second plurality of nodes to the resource credit tree based on a factor of the fan-out number.

9. The method of claim 1, further comprising:
initializing a second operation to allocate a second number of credits corresponding to the resource pool, wherein the second operation comprises a reserve parameter;
traversing, beginning at a second leaf node, the resource credit tree through a second backward traversal path to a third non-leaf node;
identifying a number of available credits of the third non-leaf node;
determining that the number of available credits of the third non-leaf node exceeds the second number of credits;
identifying a resource object comprising a count of additional available credits of the resource pool;
determining that the reserve parameter exceeds the count of additional available credits; and sending, in response to determining that the reserve parameter exceeds the count of additional available credits, a failure notification.

10. The method of claim 1, further comprising:
identifying a capacity of the first leaf node; and
transferring, based on a predefined fraction of the capacity, a plurality of credits from the first non-leaf node to the first leaf node.

11. The method of claim 1, further comprising:
initializing a second operation to allocate a second number of credits corresponding to the resource pool;
selecting, using the hash function, a second leaf node of the resource credit tree;
identifying a number of available credits of a second leaf node;
determining that the number of available credits of the second leaf node exceeds the second number of credits; and
allocating the second number of credits from the second leaf node.

12. A non-transitory computer-readable medium storing a plurality of instructions for resource management, the plurality of instructions comprising functionality to:
initialize a first operation to free a first number of credits;
initialize a first tally of cascading credits to the first number of credits;
select, using a hash function, a leaf node of a resource credit tree;
identify a capacity of the leaf node and a number of available credits of the leaf node;
calculate a first summation of the number of allocated credits and the number of available credits of the leaf node;
determine that the first summation exceeds the capacity of the leaf node;
traverse, beginning at the leaf node and based on determining that the first summation exceeds the capacity of the leaf node, the resource credit tree through a backward traversal path to a first non-leaf node of the resource credit tree, wherein the backward traversal path comprises the leaf note, the first non-lead node, and a second non-leaf node;
modify, while traversing the resource credit tree, the first tally of cascading credits based on a plurality of nodes in the backward traversal path, and wherein the first tally of cascading credits is used, while traversing the resource credit tree, a number of available credits of at least one node of the plurality of nodes based on predefined capacity of the at least one node;
identify a capacity of the first non-leaf node and a number of available credits of the first non-leaf node; and
transfer, based on the capacity of the first non-leaf node and the number of available credits of the first non-leaf node, the first tally of cascading credits to the first non-leaf node.

13. The non-transitory computer readable medium of claim 12, wherein the first number of credits correspond to a first plurality of allocated resource units, and wherein the first number of credits and the first plurality of allocated resource units are allocated to a client.

14. The non-transitory computer readable medium of claim 12, wherein the plurality of instructions further comprise functionality to:
initialize a second operation to free a second number of credits corresponding to a second plurality of allocated resource units;

initialize a second tally of cascading credits to the second number of credits;

determine that the second tally of cascading credits exceeds a threshold fraction of capacity of each node on the backward traversal path;

identify a resource object comprising a count of additional available credits of the resource pool;

free, in response to determining that the second tally of cascading credits exceeds a threshold level of capacity of each node on the backward traversal path, the second tally of allocated credits to the resource object.

15. The non-transitory computer readable medium of claim 12, wherein the plurality of instructions further comprise functionality to:

initialize a second operation to free a second number of credits corresponding to a second plurality of allocated resource units;

identify a resource object comprising a count of additional available credits of the resource pool;

determine that a third operation to allocate a third number of credits is blocked at the resource object, wherein the third number of credits is blocked by the resource object having an insufficient count of additional available credits to fulfill the third operation; and free, in response to determining that the third operation is blocked, the second number of allocated credits to the resource object.

16. The non-transitory computer readable medium of claim 12, wherein the first number of credits correspond to a number of resource units used by a client, wherein the resource credit tree is an accumulator tracking a total number of resource units used, and wherein an agent accesses the resource credit tree to identify the total number of resource units used.

17. A system for resource allocation, comprising:
a first computer processor;
a resource credit tree comprising:
   a plurality of non-leaf nodes comprising a root node and a plurality of internal nodes; and
   a plurality of leaf nodes;
a resource object comprising a count of additional available credits corresponding to at least one resource unit of a resource pool;
a first client executing on the first computer processor and comprising functionality to:
   initialize a first operation to allocate a first number of credits corresponding to at least one resource unit of a resource pool;
   initialize a first tally of cascading credits to the first number of credits;
   select, using a hash function, a first leaf node of the plurality of leaf nodes;
   identify a number of available credits of the first lead node;
   determine that the first tally of cascading credits exceeds the number of available credits of the first leaf node;
   traverse, beginning at the first leaf node, the resource credit tree through a first backward traversal path to a first non-leaf node of the plurality of non-leaf nodes;
   modify, while traversing the resource credit tree, the first tally of cascading credits based on a first number of credits and a predefined capacity of at least one node of a first plurality of nodes in the first backward traversal path, wherein the first backward traversal path comprises the first leaf node, the first non-leaf node, and a second non-lead node;
   identify a number of available credits of the first non-leaf node;
   determine that the number of available credits of the first non-leaf node exceeds the first tally of cascading credits; and
   allocate, to the first client and from the first non-leaf node, the first number of credits in response to determining that the number of available credits of the first non-leaf node exceeds the first tally of cascading credits.

18. The system of claim 17, further comprising:
a second computer processor;
a second client executing on the second computer processor and in parallel with the first client, comprising functionality to:
   initialize a second operation to allocate a second number of credits corresponding to the resource pool; and
   while traversing the resource credit tree through the first backward traversal path:
      traverse, beginning at a second leaf node, the resource credit tree through a second backward traversal path to the root node of the resource credit tree.

19. The system of claim 17, wherein a number of the first plurality of leaf nodes increases monotonically with a number of the plurality of computer processors.

* * * * *

UNITED STATES PATENT AND TRADEMARK OFFICE
CERTIFICATE OF CORRECTION

Page 1 of 1

PATENT NO. : 8,863,140 B2
APPLICATION NO. : 13/220518
DATED : October 14, 2014
INVENTOR(S) : Sistare It is certified that error appears in the above-identified patent and that said Letters Patent is hereby corrected as shown below:

In the Specification

In column 9, line 60, delete "intructions" and insert -- instructions --, therefor.

In the Claims

In column 18, line 5, in Claim 1, before "resource" insert -- a --.

In column 18, line 20, in Claim 1, delete "a" and insert -- the --, therefor.

In column 20, line 42, in Claim 12, delete "note," and insert -- node, --, therefor.

In column 20, line 42, in Claim 12, delete "non-lead" and insert -- non-leaf --, therefor.

In column 20, line 47, in Claim 12, delete "used," and insert -- used to update, --, therefor.

In column 20, line 49, in Claim 12, after "on" insert -- a --.

In column 22, line 2, in Claim 17, delete "a" and insert -- the --, therefor.

In column 22, line 8, in Claim 17, delete "lead" and insert -- leaf --, therefor.

In column 22, line 15, in Claim 17, delete "a" and insert -- the --, therefor.

In column 22, line 20, in Claim 17, delete "non-lead" and insert -- non-leaf --, therefor.

Signed and Sealed this
Twenty-eighth Day of April, 2015

Michelle K. Lee
*Director of the United States Patent and Trademark Office*